United States Patent [19]
Peters

[11] 3,893,478
[45] July 8, 1975

[54] SPHYGMOMANOMETER PRESSURE RELIEF VALVE

[76] Inventor: Rudolph W. Peters, 5786 Balmoral Dr., Oakland, Calif. 94619

[22] Filed: Feb. 4, 1974

[21] Appl. No.: 439,400

Related U.S. Application Data

[63] Continuation-in-part of Ser. No. 318,575, Dec. 26, 1972, abandoned.

[52] U.S. Cl. ...... 137/614.2; 128/2.05 G; 137/525.1; 251/205
[51] Int. Cl.² ............................... F16K 11/085
[58] Field of Search .......... 251/205, 207, 209, 145, 251/343, 345, 351, 346; 137/525.1, 625.3, 614.2; 128/205 C, 6

[56] References Cited
UNITED STATES PATENTS

| | | | |
|---|---|---|---|
| 2,176,139 | 10/1939 | Loggren | 251/145 |
| 2,604,151 | 7/1952 | Nadasdy | 251/205 X |
| 2,962,037 | 11/1960 | Simon | 251/205 X |
| 2,969,066 | 1/1961 | Holter et al. | 137/614.2 X |
| 3,138,175 | 6/1964 | Chilcoat | 137/625.3 |
| 3,254,671 | 6/1966 | Berliner | 128/2.05 G X |

*Primary Examiner*—Henry T. Klinksiek
*Attorney, Agent, or Firm*—Harris Zimmerman

[57] ABSTRACT

An infinitely variable pressure relief valve for sphygmomanometers or similar instruments for controlling the rate of flow of compressed air from a zero flow to gradual pressure relief to substantially complete and instantaneous full pressure relief. The valve comprises an axially and radially displaceable collar means having a passage therein and a pin radially extending into said passage. Disposed within said passage in said collar means is a stationary member having a tapered axial vent slot and a helical slot wherein is tracked said pin axially and radially displaceable in unison with said collar means. A sealing means is provided which is axially and radially displaceable in unison with said collar means and said pin from a first position on a first side of said tapered slot and spaced therefrom, through a plurality of intermediate positions immediately adjacent said tapered slot at a plurality of locations along the axial length of said slot, to a second position on a second side of said tapered slot and spaced therefrom.

8 Claims, 9 Drawing Figures

3,893,478
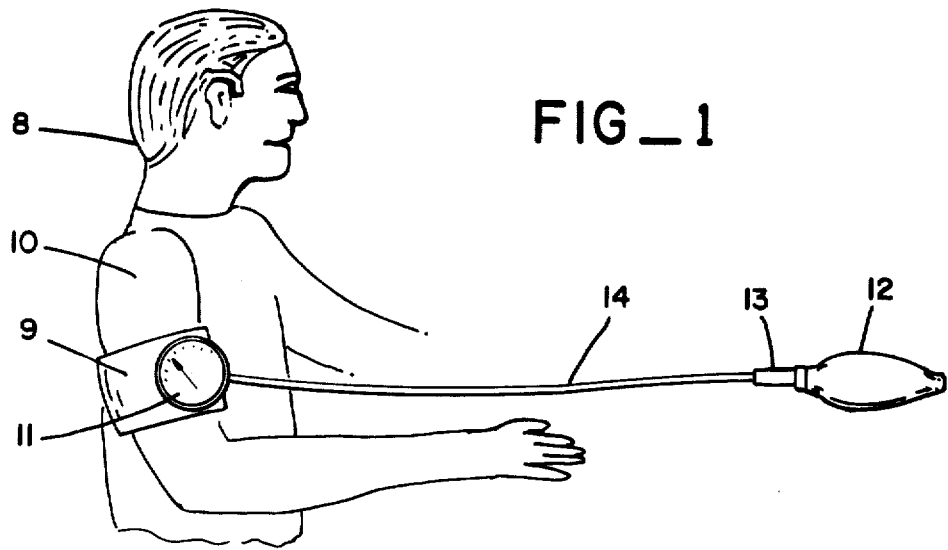
FIG_1
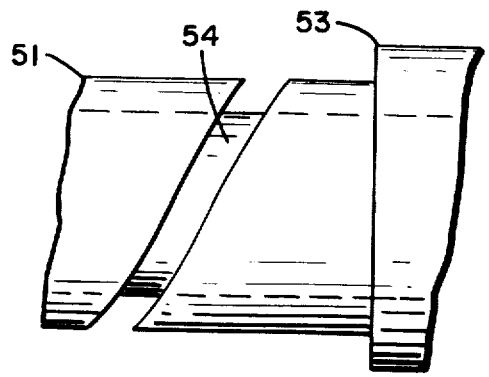
FIG_2
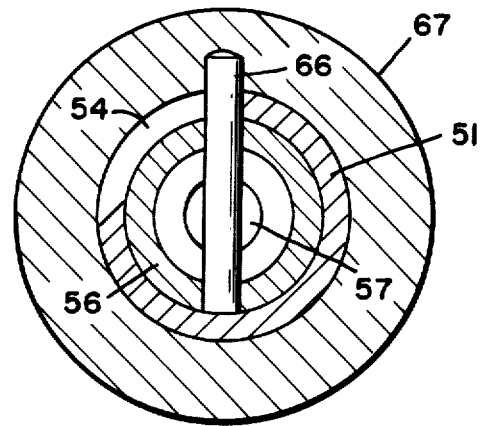
FIG_4
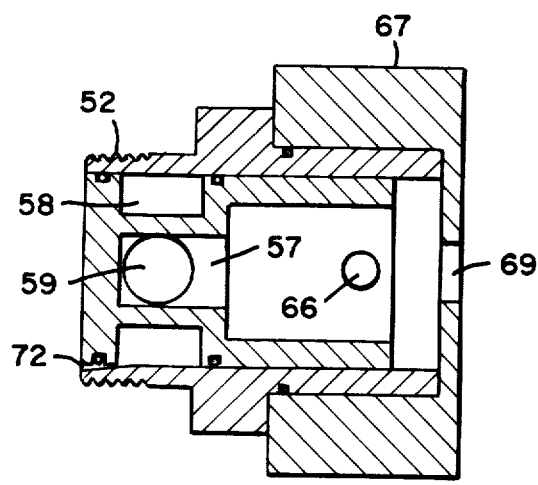
FIG_5
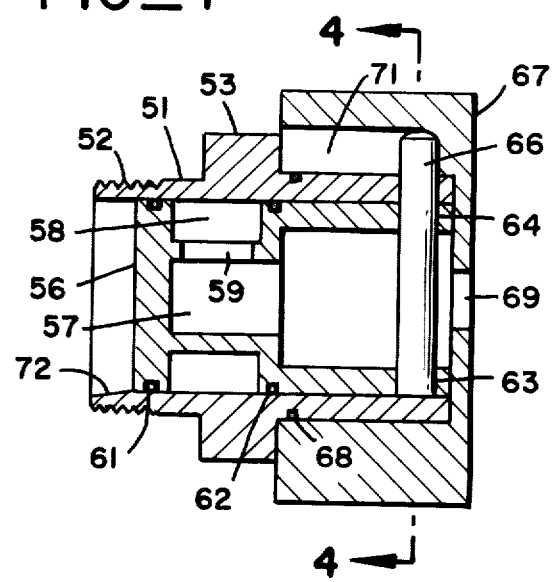
FIG_3

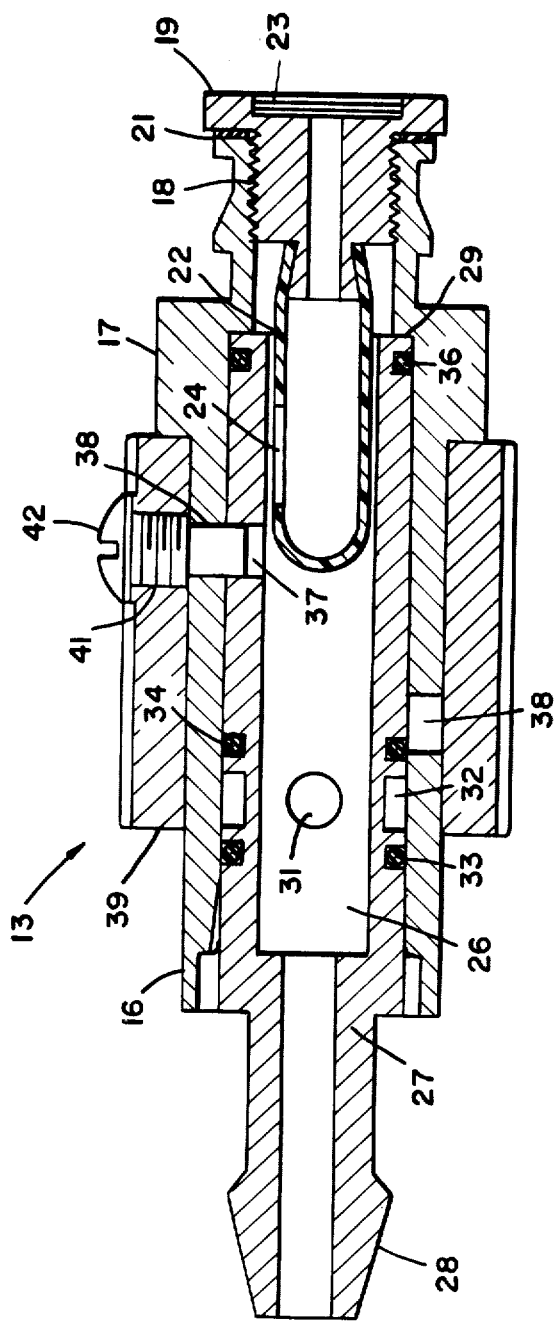
FIG_6
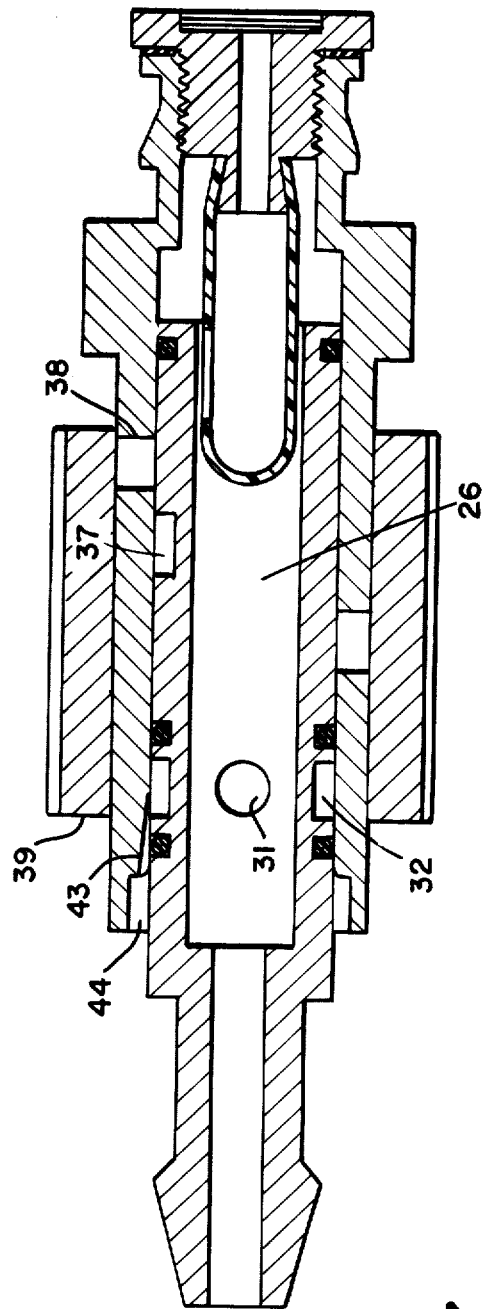
FIG_7

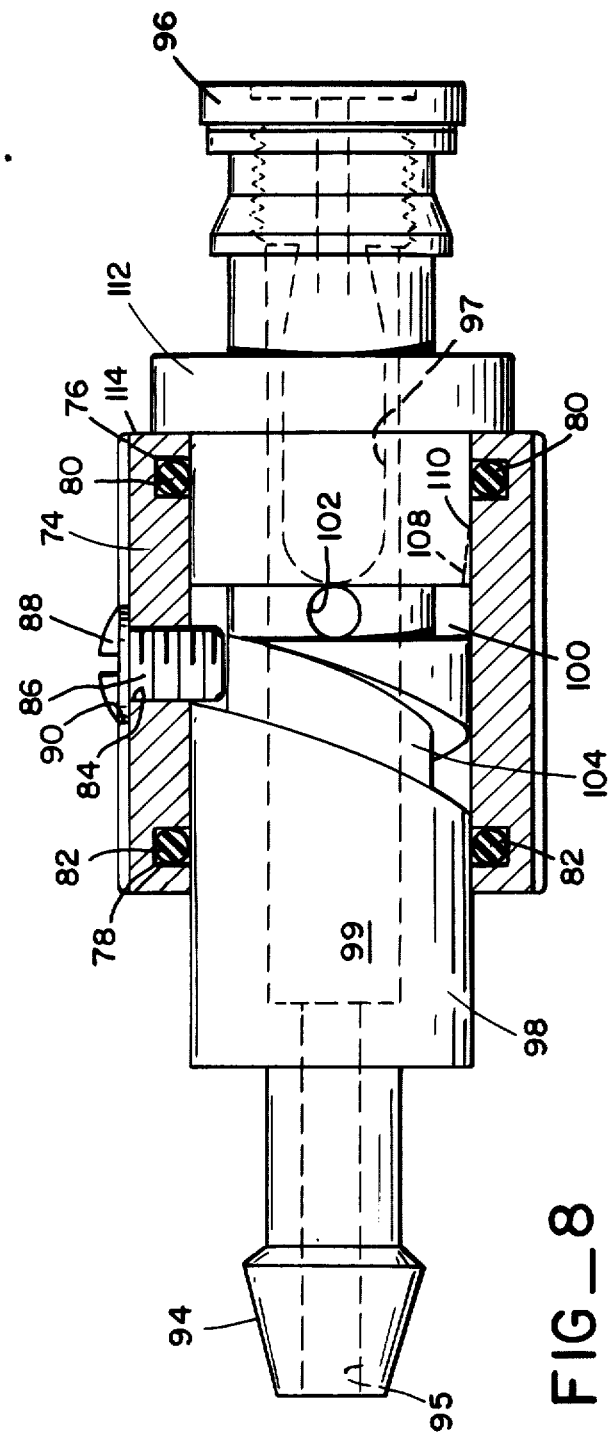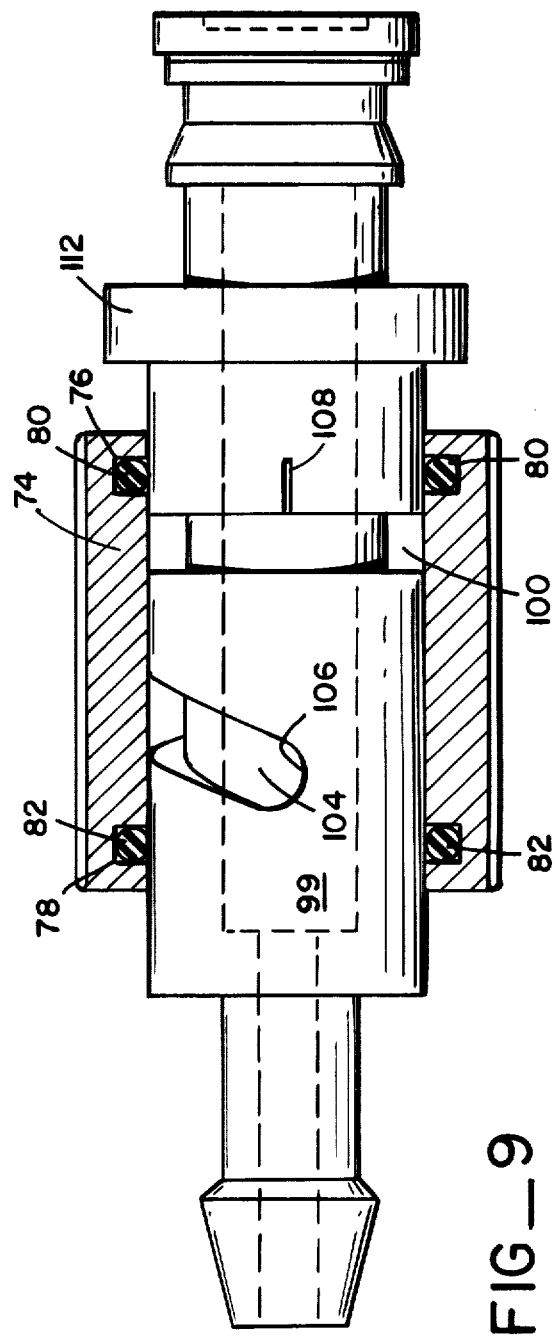

3,893,478

SPHYGMOMANOMETER PRESSURE RELIEF VALVE

REFERENCE TO PREVIOUS APPLICATION

This application is a continuation-in-part of my co-pending application Ser. No. 318,575, filed Dec. 26, 1972, for SPHYGMOMANOMETER PRESSURE RELIEF VALVE, and now abandoned.

BACKGROUND OF THE INVENTION

The pressure relief valve employed in a sphygmomanometer must be infinitely variable to accommodate all testing situations, while having extremely sensitive control of gas flow. The most common pressure relief valve known in the prior art uses a thumb screw type of adjustment which varies the blocking or unblocking of an exhaust port. This type of valve, although providing sensitive adjustment of gas flow, is easily clogged by foreign matter or dirt due to the inherently small discharge port. Further, the sensitivity of the prior art valves requires many revolutions of the thumb screw between fully closed position and fully open position. This means in practice that subsequent to reading the diastolic pressure on the sphygomomanometer, the physician or medic must laboriously turn the thumb screw to open the pressure relief valve, and relieve the remaining air pressure. Because the prior art valves cannot be opened instantly to relieve the remaining air pressure, annoying and time-consuming delays in blood pressure testing procedures may result.

SUMMARY OF THE INVENTION

The present invention is directed toward a pressure relief valve which provides infinitely variable, precise adjustment of gas flow while providing quick adjustment to a fully open "dump" condition to vent all gas pressure quickly. It comprises a tubular, cylindrical valve body containing a pressurized gas and slidably secured within a passage through a valve casing. An adjustment collar rotatably secured about the valve casing has a pin extending radially inwardly through a helical slot in the valve casing and into an aperture in the valve body. Rotation of the adjustment collar causes the pin to ride in the helical slot, causing the collar and valve body to translate axially while rotating. An exhaust port in the wall of the valve body is brought into contact with a tapered exhaust vent in the valve casing as the valve body translates, allowing pressurized gas to be vented to the ambient atmosphere. Further translation increases the contact area between the exhaust port and exhaust vent, thereby increasing the flow of pressurized gas, and permitting control of the rate of pressure relief.

THE DRAWINGS

FIG. 1 is a view of the present invention in use in a typical environment.
FIG. 2 is a side view of part of one embodiment.
FIG. 3 is a cutaway view of one embodiment.
FIG. 4 is a cutaway view of one embodiment.
FIG. 5 is a cutaway view as shown in FIG. 3.
FIG. 6 is a cutaway view of a further embodiment.
FIG. 7 is a cutaway view of the embodiment shown in FIG. 6.
FIG. 8 is a cutaway view of yet a further embodiment.
FIG. 9 is a cutaway view of the embodiment shown in FIG. 8.

DESCRIPTION OF THE PREFERRED EMBODIMENT

The pressure relief valve of the present invention may be advantageously employed in a sphygmomanometer. As shown in FIG. 1, a patient 8 has a pressure cuff 9 secure about his arm 10, with a pressure gauge 11 secured to the cuff. A rubber bulb 12 is used to pump pressurized air into the cuff through flexible tube 14. Secured between the bulb and the flexible tubing is the pressure relief valve 13.

As shown in FIG. 6, the pressure relief valve 13 comprises a cylindrical, tubular valve casing 16 with a shoulder 17 at one end, and an interior threaded portion 18. A threaded plug 19 with an axial passage therethrough, is secured in the portion 18, with a washer 21 providing a pressure tight seal. A flexible bladder 22 secured to the plug communicates with the passage, and pressurized air is pumped into the passage by the bulb 12, which is secured to the threaded portion 23. A slit 24 in the bladder permits gas of higher pressure in the bladder to flow into the chamber 26, while preventing higher pressure gas from returning into the bladder. Thus the bladder acts as a one-way valve to maintain or increase pressure within chamber 16.

The chamber 26 is formed within the tubular, cylindrical valve body 27, which is slidably secured within the valve casing. The valve body, which has a male connector 28 to secure the flexible tubing 14, is limited in its axial motion by the internal shoulder 29 of the valve casing. An exhaust passage 31 in the wall of the valve body communicates with the exhaust port 32, which is an annular groove in the exterior of the valve body. O-ring seals 33 and 34 in their respective grooves prevent any pressure leaks from the exhaust port 32 through the valve body - valve casing interface, and O-ring 36 in its groove prevents pressure loss at the other end of the valve body, when the valve body is positioned as in FIG. 6. An annular groove 37 in the exterior of the valve body partially circumscribes the valve body.

A helical slot 38 extends through and partially circumscribes the valve casing in the fashion of a left-hand thread. A knurled adjustment collar 39 is slidably secured about the valve casing, abutting the shoulder 17. A tapped hole 41 in the collar receives the threaded portion of a pin 42, which extends through the helical slot 38 and into the groove 37 in the valve body. Manual rotation of the adjustment collar causes the pin 42 to ride in the helical slot 38, thereby causing the pin and the collar to translate axially while rotating, as shown in FIG. 7. Because the pin extends into the groove 37, translation of the pin causes the valve body also to translate in relation to the valve casing. As the valve body translates, the exhaust port 32 begins to contact the tapered exhaust vent 43, allowing some pressurized gas from the chamber 26 to flow through the exhaust passage 31 and the exhaust port 32 to the exhaust vent 43 and thence to the ambient atmosphere. The rate of flow depends upon the contact area between the port 32 and the vent 43, which is controlled by the translation of the valve body caused by manual rotation of the adjustment collar 39. Thus rotation of the adjustment collar provides an infinitely variable, precise control of the rate of pressure relief. Moreover, the exhausting gas tends to cleanse the vent of any foreign matter or dirt.

Further rotation of the adjustment collar causes the valve body to translate further so that the exhaust port 32 contacts the groove 44 in the interior circumference of the valve casing. The greater diameter of the groove 44 provides a greater passage area for the exhausting gas, allowing the pressure within the chamber 26, the tubing 14, and the pressure cuff 9 to exhaust quickly. Thus, after the physician or medic has determined the diastolic pressure from the gauge 11, a further rotation of the adjustment collar quickly vents all of the pressure in the cuff, saving the valuable time normally required by prior art devices for the pressure to slowly escape. A counter-rotation of the adjustment collar restores the pressure relief valve to the configuration of FIG. 6, and the valve is sealed and ready for re-use.

A more compact embodiment of the present invention is shown in FIG. 3. It consists of a hollow, cylindrical valve casing 51, which has an externally threaded end 52, and a shoulder 53. The valve casing has a helical slot 54 therethrough, in the fashion of a left-hand thread. The slot partially circumscribes the casing, as shown in FIG. 2. Concentric within the valve casing and slidably secured within is a valve body 56, which has a chamber 57 therein. An exhaust port 58 formed of an annular groove in the valve body communicates with the chamber 57 through passage 59. O-ring seals 61 and 62 in their respective grooves in the valve body prevent any pressure leaks through the valve body - valve ring interface. Radially aligned apertures 63 and 64 in the valve body receive a pin 66, which also extends through the helical slot 54, as shown in FIG. 4.

An adjustment collar 67 is rotatably received about the valve casing and secured thereto by means of snap ring 68 in a manner commonly known in the art. The adjustment knob has an opening 69 which connects chamber 57 with the ambient atmosphere, and a longitudinal slot 71 which accommodates the protruding portion of the pin 66.

The assembly of this embodiment of the invention is extremely quick and uncomplicated. First the valve body with its associated O-rings is inserted into the valve casing. The snap ring 68 is then placed in its groove in the casing 51, and the pin 66 is inserted through the helical slot 54 into apertures 63 and 64. The adjustment knob is then placed on the valve casing 51, with the protruding portion of the pin in the slot 71. The knob is snapped into place by forcing it over the snap ring until the ring snaps into an annular groove in the interior wall of the knob, thereby locking it in place while allowing it to rotate freely. The knob secures the components of the valve together, and the assembly is completed.

In operation the valve is secured to a chamber of pressurized gas by means of threaded portion 52 of the valve casing. In the configuration of FIG. 4, the valve is sealed and no pressure relief will occur. Because the pin 66 protrudes into the slot 71, manual rotation of the adjustment knob in the counterclockwise direction causes the pin to ride in the helical slot, thereby causing both the pin and the valve body to translate axially toward end 52 as they rotate.

As shown in FIG. 5, axial translation of the valve body causes the exhaust port 58 to move into contact with the exhaust vent 72, which is formed of a tapered portion of the inner lip of the valve casing. An exhaust path is formed through the vent 72, the exhaust port 58, the passage 59, into the chamber 57 and out the aperture 69 to the ambient atmosphere. Because increased translation of the valve body increases the cross-sectional area of contact between the exhaust port and vent, greater gas flow will result. Thus the amount of rotation of the adjustment knob precisely controls the rate of pressure relief and gas flow.

To obtain still greater, almost instantaneous rate of exhaust, it may be appreciated from FIG. 5 that if the adjustment collar 67 is rotated yet further counterclockwise, the O-ring seal 61 will effectively move beyond that end of tapered slot 72 most near end 52 of valve body 56, thereby opening for exhaust a cross-sectional area of much larger magnitude than that made available by the tapered vent 72 at any position along its tapered depth. Of course, clockwise rotation of the adjustment knob returns the valve body and the pin to their positions as seen in FIG. 3, re-sealing the valve and stopping all gas flow.

A yet further simplified embodiment of the instant invention is shown in FIGS. 8 and 9. It consists of a tubular, cylindrical, knurled adjustment collar 74, with two annular rear and forward O-ring retaining slots, 76 and 78 respectively, machined into the inner cylindrical surface thereof. Compressively fitted into said slots are, respectively, O-ring seals 80 and 82. Also machined into collar 74 is a tapped bore hole 84, into which is threaded a machine pin 86. Pin 86 is of sufficient length that, when its head 88 is seated against the countersunk boss 90 in the outer cylindrical surface of collar 74, a portion of the pin's distal extremity extends beyond bore hole 84 and into the inner tubular portion of said collar.

Also comprising part of the instant embodiment is a valve body 98 having a forward male connector 94, a threaded plug 96, and a flexible bladder 97 similar to a previously-discussed embodiment. The major component of the instant embodiment is a tubular, cylindrical valve body having an annular shoulder 112 and a longitudinal cylindrical passage 99, and machined as follows. Valve body 98 has an annular slot 100 of constant depth machined into the complete 360° extent of its periphery, and a diametric borehole 102 machined completely through said valve body. Said borehole 102 extends along an axis generally perpendicular to the major cylindrical axis of passage 99, and intersects the annular slot 100 at two locations at the distal extremities of said borehole. The diameter of borehole 102 may be seen in FIG. 8 to be generally equal to the width of annular slot 100 as measured parallel to said cavity cylindrical axis.

Also machined into valve body 92 is a left-handed helical slot 104 of constant depth which intersects annular slot 100 at a location immediately adjacent the intersection point of diametric borehole 102 with slot 100. The forward distal end of helical slot 104 terminates in a blind fillet wall 106 at a location generally 270° removed from said point of intersection of diametric borehole 102 with annular slot 100. Rearwardly extending from annular slot 100 at a position also generally 270° removed from said point of intersection is a longitudinally-extending tapered exhaust vent 108. As may be seen in FIG. 8, tapered exhaust vent 108 is of greatest depth at the position of its intersection with annular slot 100, its depth progressively decreasing as said groove extends rearwardly designated at 110, longitudinally disposed intermediate annular slot 100 and shoulder 112.

The assembled embodiment is best seen in FIG. 8. The collar 74 is slidably fitted over the outer cylindrical surface of valve body 92 and moved axially rearwardly until vertical side surface 114 of the collar abuts shoulder 112 of the valve body. In this position, the O-rings 80 and 82 seated in retaining slots 76 and 78 compressively contact the outer surface of the valve body and form airtight seals at the points of contact. The collar 74 is then rotated until the tapped borehole 84 is axially aligned with helical slot 104 at its point of intersection with annular slot 100. The machine pin 86 is then threaded into borehole 84 with its head 88 seated in countersunk boss 90, said pin's distal extremity thereby extending into the inner tubular passage of said collar, as previously discussed, and cooperatively engaging and tracking in said helical slot 104 at said point of intersection with annular slot 100.

To create a pressurized condition within the pressure cuff secured about the patient's arm, the collar is maintained in the orientation just described, i.e., with side surface 114 of collar 74 abutting shoulder 112 of the valve body. The external rubber bulb is then repetitively manually squeezed and released, thereby forcing pressurized air through the flexible bladder 97 into cylindrical passage 99 in the valve body. Said air has now two possible paths to follow. The first path is a direct flow through the bore 95 in male connector 94 to the flexible tube leading to the cuff. The second path is a sequential flow through the diametric borehole 102, annular slot 100 and spiral slot 104 which are in fluid communication with said borehole. But, as may be appreciated from FIG. 8, because of the airtight seals of O-rings 80 and 82 against the outer surface of the valve body, said pressurized air is effectively trapped between both said slots and the collar inner surface. As a result, the pressurized air flows along the first said path; i.e, through bore 95 in male connector 94 to the flexible tube leading to the cuff.

The instant embodiment makes possible an infinitely variable number of low venting rates, as well as a quick venting rate.

To slowly reduce cuff pressure in controlled low-rate venting, the collar 94 is manually rotated slightly in the counterclockwise direction. The pin 86 tracks in the helical slot 104, thereby causing the collar to translate axially from shoulder 112 while rotating. As the collar so translates, the rear O-ring 80 also translates forward to a position, as shown in FIG. 9, directly adjacent tapered exhaust vent 108. Since the O-ring cannot expand to totally occlude said vent, said vent is effectively placed in fluid communication with the ambient atmosphere, thereby permitting pressurized air in passage 99 to exhaust at a very low rate. For example, experimentation has shown that vent rates as low as 1 cubic inch per 24 hours can be successfully metered with the instant embodiment. To slightly increase the exhaust rate, the collar need only be rotated slightly additionally counterclockwise. Since the tapered exhaust vent increases in depth and cross-sectional area as it extends forward to the point of its intersection with annular slot 100, it may be appreciated that, as the collar and rear O-ring translate axially further, said O-ring becomes adjacent on increased depth of said tapered vent, which is thereby exposed to ambient atmosphere. This is achieved a slightly increased vent rate. And, by rotating said collar yet further, ever-increasing depths and cross-sectional areas of said vent will be exposed to ambient atmosphere, thereby achieving ever-increasing low-magnitude vent rates across an infinitely variable range. For example, experimentation has further shown that with the instant embodiment, the 2 to 3 millimeter-of-mercury drop per second generally recommended by American Heart Association standards for sphygmomanometer use is easily achieved.

And, it may be further appreciated that since the axial translation of the collar and rear O-ring is quite slight as compared to their corresponding gross annular displacement when the collar is manually rotated, a vernier effect is achieved whereby very precise low-magnitude vent rates can be achieved by relatively coarse manual rotation manipulation of the collar.

To achieve a still greater cross sectional area for even more rapid exhausting of the pressurized air within passage 99, the collar 74 is rotated even farther to the full extent of the travel of pin 86 in helical slot 104; i.e., where said pin extremity abuts the blind fillet wall 106 of helical slot 104. This ultimate rotation causes complete axial translation of the rear O-ring 80 completely past the tapered vent so to be adjacent the entire annular slot 100. With said O-ring in this position, the pressurized air within cavity 99 may exhaust directly to atmosphere around the full 360° periphery of annular slot 100. The area now available for exhaust is, of course, many magnitudes greater than the area previously made available by the tapered vent 108 at even its maximum depth position. Thus, it may be appreciated that when the collar is rotated to this ultimate position, extremely high-rate exhaust venting is achieved. And, as an ancillary feature, this high-rate venting creates a surge of exhaust air sufficiently energized to purge dirt and foreign matter from the valve body. Of course, to reseal the valve and stop all exhaust flow, it is only necessary to rotate the collar clockwise to its original position abutting shoulder 112.

Thus the present invention provides a valve which both precisely controls the flow of gas under pressure, and provides for instantaneous pressure relief. The valve is infinitely variable in adjustment, non-clogging because of its large annular exhaust space, leakproof, and easily and quickly assembled.

I claim:

1. A valve for controlling the rate of flow of a fluid from a zero flow through gradual pressure relief to substantially complete and instantaneous full pressure relief, comprising: an axially and rotationally displaceable collar having an axial passage therein and a pin radially extending into said passage; a stationary first member generally disposed within said passage in said collar and having a helical slot wherein is tracked said pin, said pin and said helical slot constituting means for axially moving said collar on said first member when said collar is rotated with respect to said first member, said first member having a through axial passage providing an inlet and an axially opposed outlet, and said first member further having an outwardly opening vent slot having its effective cross sectional area axially increasing in one direction and being in fluid communication with said first member axial passage; sealing means axially displaceable in said one direction and rotationally displaceable in unison with said collar and said pin from a first position on a first axially side of said vent slot and axially spaced therefrom, through a plurality of intermediate positions immediately radially adjacent said vent slot at a plurality of locations along the axial length of said vent slot, to a second position on the axially opposite side of said vent slot and axially spaced therefrom for correspondingly sealing said vent slot with respect to the atmosphere in said first position, providing increasing pressure relief for said first member axial passage through said intermediate positions and completely venting the pressure from said first member axial passage in said second position.

2. The valve of claim 1 wherein said collar is generally tubular and of right circular cylindrical shape, and said passage therein extends generally parallel to the central cylindrical axis of said collar.

3. The valve of claim 1 wherein said stationary first member has a bore therein wherein is received a second member rotationally and radially displaceable in unison with said collar.

4. The valve of claim 3 wherein said sealing means is secured to said second member.

5. The valve of claim 1 further including an annular slot extending about the periphery of said first member and intersecting said vent slot at only one location along said periphery and at least partially providing the fluid communication between said vent slot and said first member axial passage.

6. The valve of claim 5, wherein said first member has a diametric borehole therein, said borehole intersecting said annular slot at two locations along the extent of said annular slot and intersecting said first member axial passage between said two locations.

7. The valve of claim 6 wherein said helical slot intersects said annular slot at one of said locations of intersection of said diametric borehole with said annular slot.

8. The valve of claim 1, including a one way valve within said axial passage of said first member and including a flexible bladder having a slit therein.

* * * * *